(12) United States Patent
Yamashita et al.

(10) Patent No.: US 10,975,778 B2
(45) Date of Patent: Apr. 13, 2021

(54) CONTROL DEVICE FOR INTERNAL COMBUSTION ENGINE

(71) Applicant: TOYOTA JIDOSHA KABUSHIKI KAISHA, Toyota (JP)

(72) Inventors: Yoshiyuki Yamashita, Susono (JP); Yukihiro Nakasaka, Sunto-gun (JP); Hiroki Murata, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 15/905,042

(22) Filed: Feb. 26, 2018

(65) Prior Publication Data

US 2018/0245522 A1 Aug. 30, 2018

(30) Foreign Application Priority Data

Feb. 28, 2017 (JP) .............................. JP2017-037322

(51) Int. Cl.
| | |
|---|---|
| *F02D 15/04* | (2006.01) |
| *F02D 41/00* | (2006.01) |
| *F02D 41/14* | (2006.01) |
| *F02B 75/04* | (2006.01) |
| *F02D 15/02* | (2006.01) |

(52) U.S. Cl.
CPC ............ *F02D 15/04* (2013.01); *F02B 75/041* (2013.01); *F02D 41/005* (2013.01); *F02D 41/0072* (2013.01); *F02D 41/1402* (2013.01); *F02D 15/02* (2013.01); *F02D 2200/1002* (2013.01); *F02D 2700/03* (2013.01)

(58) Field of Classification Search
USPC ....................................................... 123/48 R
See application file for complete search history.

(56) References Cited

U.S. PATENT DOCUMENTS

| | | | |
|---|---|---|---|
| 2006/0070605 A1* | 4/2006 | Akihisa | ............... F02D 13/0234 |
| | | | 123/478 |
| 2011/0290218 A1* | 12/2011 | Yoshioka | ................ F02D 21/08 |
| | | | 123/48 R |

FOREIGN PATENT DOCUMENTS

| | | |
|---|---|---|
| CN | 1774567 A | 5/2006 |
| CN | 102301110 A | 12/2011 |
| JP | 2003-314318 | 11/2003 |
| JP | 2012-225199 A | 11/2012 |
| JP | 2016-050537 A | 4/2016 |

\* cited by examiner

*Primary Examiner* — Lindsay M Low
*Assistant Examiner* — Omar Morales
(74) *Attorney, Agent, or Firm* — Finnegan, Henderson, Farabow, Garrett & Dunner, LLP

(57) ABSTRACT

A control device for controlling an internal combustion engine equipped with an engine body, a variable compression ratio mechanism A configured to be able to change a mechanical compression ratio of the engine body, and an intake system configured to be able to make exhaust discharged from combustion chambers of the engine body be recirculated to an intake passage of the engine body. The control device is provided with a compression ratio control part controlling the variable compression ratio mechanism A so that the mechanical compression ratio becomes the target compression ratio. The compression ratio control part sets the target compression ratio at a lower value when exhaust is being recirculated at a predetermined operating region at an engine low load side than when exhaust is not being recirculated.

4 Claims, 16 Drawing Sheets

FIG. 4B
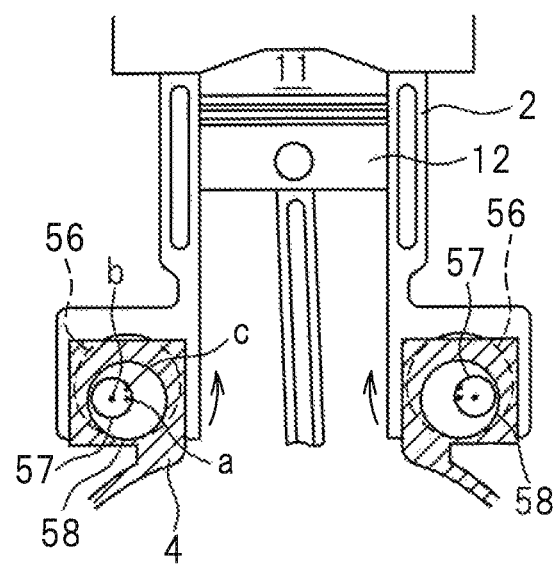
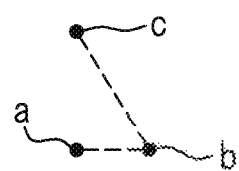

FIG. 4C
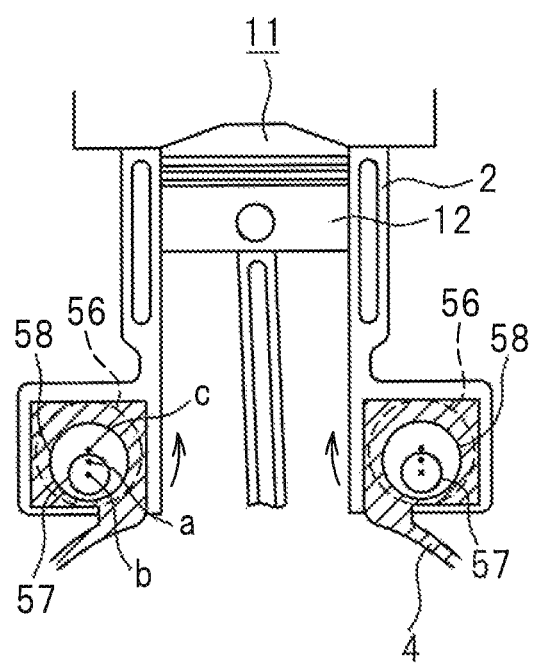
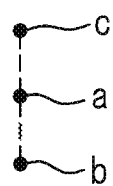

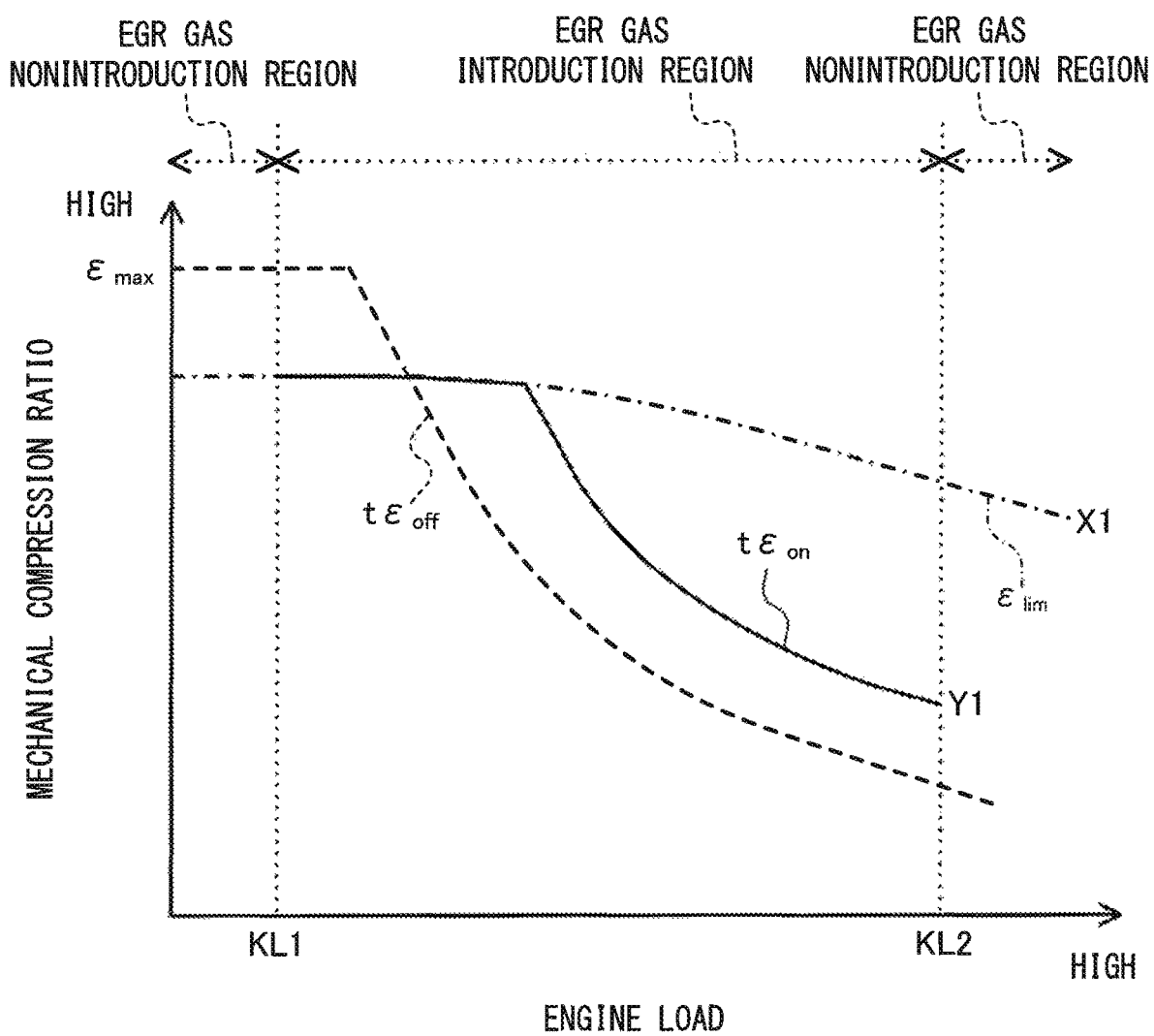

CONTROL DEVICE FOR INTERNAL COMBUSTION ENGINE

CROSS-REFERENCE TO RELATED APPLICATION

This application claims priority based on Japanese Patent Application No. 2017-037322 filed with the Japan Patent Office on Feb. 28, 2017, the entire contents of which are incorporated into the present specification by reference.

TECHNICAL FIELD

The present disclosure relates to a control device for an internal combustion engine.

BACKGROUND ART

JP2003-314318A discloses a conventional control device for an internal combustion engine configured to lower a compression ratio to cause recirculation of exhaust at an engine high load side and to raise the compression ratio to cause recirculation of exhaust at an engine low load side.

SUMMARY OF DISCLOSURE

When an engine load further falls from a state at an engine low load side where exhaust is made to recirculate, to secure stability of combustion, it is necessary to fully close an EGR valve to stop the recirculation of exhaust. However, even after fully closing the EGR valve, for a short while, exhaust remaining in an EGR passage at a downstream side from the EGR valve is introduced into cylinders. For this reason, in the above-mentioned conventional control device of an internal combustion engine, when stopping the recirculation of exhaust from the state of making the exhaust recirculate, combustion is liable to transiently become unstable.

The present disclosure was made focusing on such a problem and has as its object to keep combustion from becoming unstable when making recirculation of exhaust stop.

To solve the above problem, according to one aspect of the present disclosure, there is provided a control device of an internal combustion engine for controlling an internal combustion engine provided with an engine body, a variable compression ratio mechanism configured to be able to change a mechanical compression ratio of the engine body, and an intake system configured to make exhaust discharged from a combustion chamber of the engine body recirculate to an intake passage of the engine body. The control device comprises a compression ratio control part configured to control the variable compression ratio mechanism so that the mechanical compression ratio becomes a target compression ratio. Further, the compression ratio control part is configured to set the target compression ratio to a lower value when exhaust is being recirculated at a predetermined operating region at an engine low load side than when exhaust is not being recirculated.

According to this aspect of the present disclosure, it is possible to keep combustion from becoming unstable when recirculation of exhaust is stopped.

BRIEF DESCRIPTION OF DRAWINGS

FIG. 4B is a view explaining operation of a variable compression ratio mechanism.

FIG. 4C is a view explaining operation of a variable compression ratio mechanism.

FIG. 5 is a view showing a target compression ratio $t\varepsilon_{on}$ at the time of introduction of EGR gas and a target compression ratio $t\varepsilon_{off}$ at the time of no introduction of EGR corresponding to an engine load in the present embodiment at a certain engine rotational speed.

DESCRIPTION OF EMBODIMENTS

Figure 1:
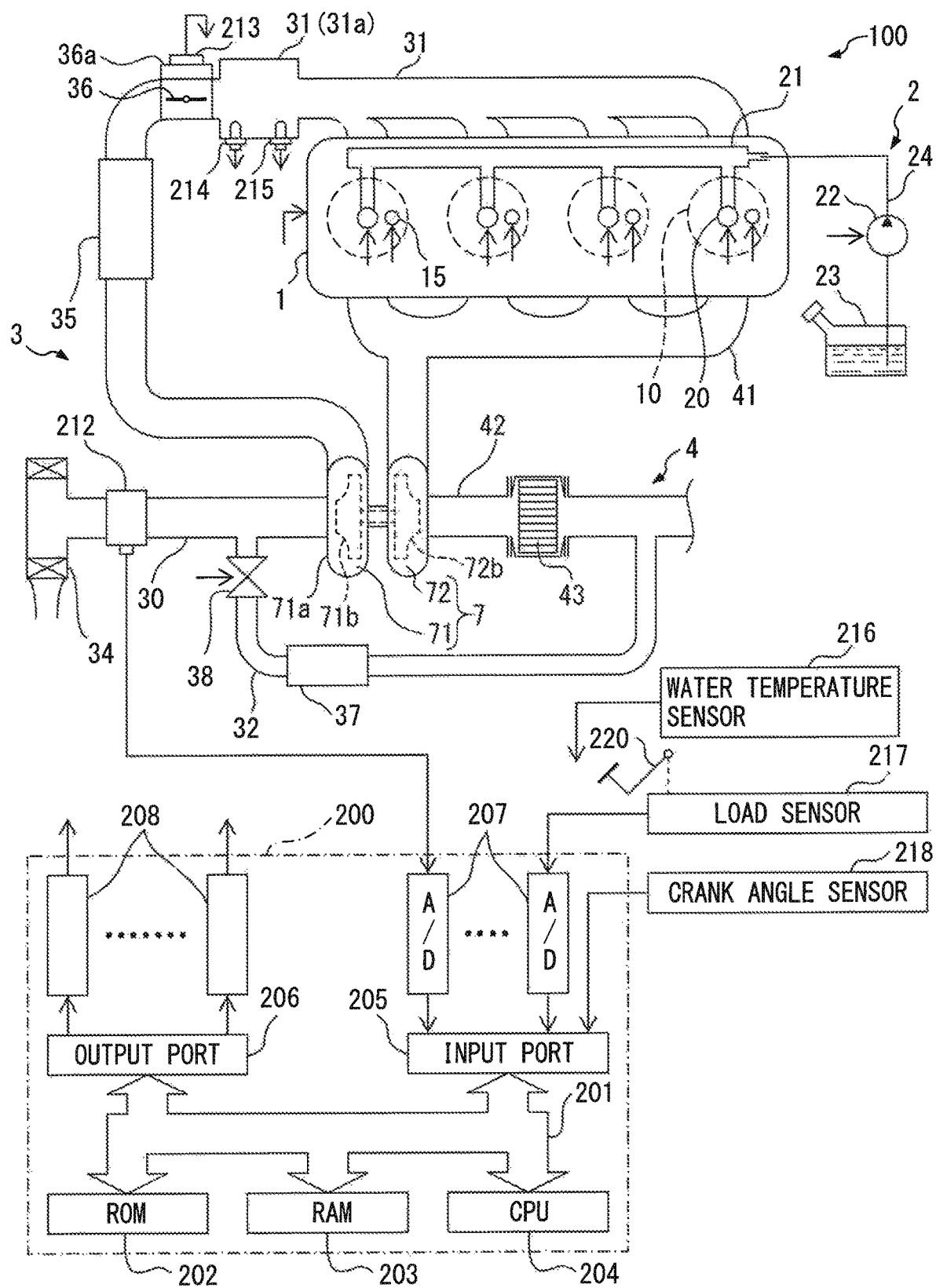
FIG. 1 is a schematic view of the configuration of an internal combustion engine and an electronic control unit controlling the internal combustion engine.

Below, referring to the drawings, embodiments of the present disclosure will be explained in detail. Note that, in the following explanation, similar constituent elements will be assigned the same reference numerals.

First Embodiment

Figure 2:
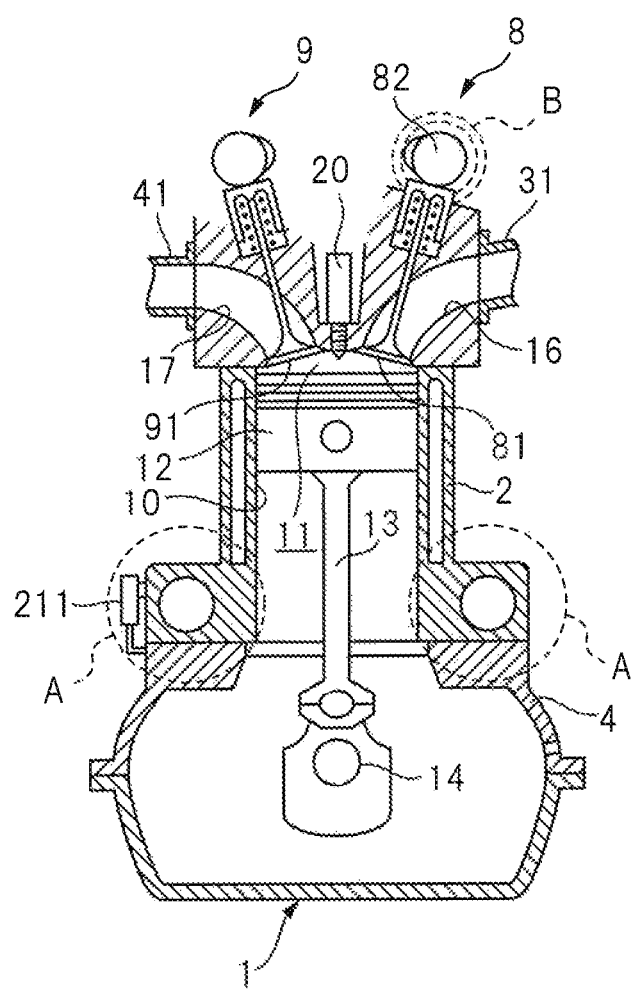
FIG. 2 is a cross-sectional view of an engine body of an internal combustion engine.

FIG. 1 is a schematic view of the configuration of an internal combustion engine 100 and an electronic control unit 200 controlling the internal combustion engine 100 according to a first embodiment of the present disclosure. FIG. 2 is a cross-sectional view of an engine body 1 of the internal combustion engine 100.

The internal combustion engine 100 is provided with an engine body 1 provided with a plurality of cylinders 10, a fuel feed system 2, an intake system 3, and an exhaust system 4.

The engine body 1 burns fuel inside combustion chambers 11 formed in the cylinders 10 (see FIG. 2) to for example generate the power for driving a vehicle etc. The engine body 1 is provided with a spark plug 15 for each cylinder so as to face a combustion chamber 11 or the cylinder 10.

Further, as shown in FIG. 2, the engine body 1 is provided with a pair of intake valves 81 and a pair of exhaust valves 91 for each cylinder and is provided with an intake valve operating device 8 for driving opening and closing operations of the intake valves 81 and an exhaust valve operating device 9 for driving opening and closing operations of the exhaust valves 91. The intake valve operating device 8 according to the present embodiment is configured to be able to control opening and closing timings of an intake valve 81 to any timings by making an intake camshaft 82 drive opening and closing operations of the intake valves 81 and providing at one end of the intake camshaft 82 a variable valve operation mechanism B changing a relative phase angle of the intake camshaft 82 with respect to a crankshaft 14 by hydraulic control.

Inside each cylinder 10, a piston 12 receiving combustion pressure and reciprocating inside the cylinder 10 is held. The piston 12 is connected with the crankshaft 14 through a connecting rod 13. Reciprocating motion of the piston 12 is transformed into rotary motion by the crankshaft.

Further, the engine body 1 according to the present embodiment is provided with a variable compression ratio mechanism A at a connecting part of the cylinder block 2 and crankcase 4. The variable compression ratio mechanism A according to the present embodiment changes the relative positions of the cylinder block 2 and crankcase 4 in the cylinder axial line direction to thereby change the volume of a combustion chamber 11 when the piston 12 is positioned at compression top dead center. At the connecting part of the cylinder block 2 and crankcase 4, a relative position sensor 211 is attached for detecting the relative positional relationship of the cylinder block 2 and the crankcase 4. From this relative position sensor 211, an output signal showing a change in the gap between the cylinder block 2 and crankcase 4 is output. The output signal of the relative position sensor 211 is input through a corresponding AD converter 207 to an electronic control unit 200. The electronic control unit 200 detects the mechanical compression ratio of the engine body 1 based on the output signal of the relative position sensor 211. Details of the variable compression ratio mechanism A will be explained referring to FIG. 3 to FIG. 40.

Returning to FIG. 1, the fuel feed system 2 is provided with electronic control type fuel injectors 20, a delivery pipe 21, supply pump 22, fuel tank 23, and pressure pipe 24.

One fuel injector 20 is provided at each cylinder 10 to be arranged at the center top of the combustion chamber 11 so as to adjoin the spark plug 15 and so as to face the combustion chamber 11 of the cylinder 10. The opening time (injection amount) and opening timing (injection timing) of the fuel injector 20 are changed by control signals from the electronic control unit 200, If the fuel injector 20 is opened, fuel is directly injected from the fuel injector 20 to the inside of the combustion chamber 11.

The delivery pipe 21 is connected through the pressure pipe 24 to the fuel tank 23. In the middle of the pressure pipe 24, a supply pump 22 is provided for pressurizing the fuel stored in the fuel tank 23 and supplying it to the delivery pipe 21. The delivery pipe 21 temporarily stores high pressure fuel pumped from the supply pump 22. If the fuel injector 20 is opened, the high pressure fuel stored in the delivery pipe 21 is directly injected from the fuel injector 20 into the combustion chamber 11.

The supply pump 22 is configured to be able to change a discharge amount. The discharge amount of the supply pump 22 is changed by a control signal from the electronic control unit 200. By controlling the discharge amount of the supply pump 22, the fuel pressure inside the delivery pipe 21, that is, the injection pressure of the fuel injectors 20, is controlled.

The intake system 3 is a system for guiding intake to the insides of the combustion chambers 11 and is configured to be able to change the state of intake taken into the combustion chambers 11 (intake pressure, intake temperature, and amount of EGR (exhaust gas recirculation) gas). The intake system 3 is provided with an intake passage 30, intake manifold 31, and EGR passage 32.

The intake passage 30 is connected at one end to an air cleaner 34 and is connected at the other end to an intake collector 31a of the intake manifold 31. In the intake passage 30, in order from the upstream side, an air flow meter 212, a compressor 71 of an exhaust turbocharger 7, an intercooler 35, and a throttle valve 36 are provided.

The air flow meter 212 detects the flow of air flowing through the inside of the intake passage 30 and finally taken into the cylinders 10 (below, referred to as the "intake amount").

The compressor 71 is provided with a compressor housing 71a and a compressor wheel 71b arranged inside the compressor housing 71a. The compressor wheel 71b is driven to rotate by a turbine wheel 72b of the exhaust turbocharger 7 attached coaxially to it and compresses and discharges intake flowing into the compressor housing 71a.

The intercooler 35 is a heat exchanger for cooling the intake compressed and rendered a high temperature by the compressor 71 by for example outside cooling air, cooling water, etc.

The throttle valve 36 changes the passage cross-sectional area of the intake passage 30 to thereby adjust the amount of intake introduced into the intake collector 31a. The throttle valve 36 is driven to open and close by a throttle actuator 36a, then a throttle sensor 213 detects the opening degree (throttle opening degree).

The intake manifold 31 is connected to an intake port 16 formed at the engine body 1 (see FIG. 2) and distributes the intake flowing in from the intake passage 30 through the intake port 16 equally to the cylinders 10. At the intake collector 31a of the intake manifold 31, an intake pressure sensor 214 for detecting the pressure of the intake taken into the cylinders (intake pressure) and an intake temperature sensor 215 for detecting the temperature of the intake taken into the cylinders (intake temperature) are provided.

The EGR passage 32 is a passage for connecting the exhaust passage 42 and the intake passage 30 and enabling part of the exhaust discharged from the cylinders 10 to be returned to the intake passage 30 by the pressure difference and enabling the exhaust returned to the intake passage 30 to be finally recirculated to the cylinders 10. Below, the exhaust flowing into the EGR passage 32 will be referred to as the "EGR gas". In the EGR passage 32, in order from the upstream side, an EGR cooler 37 and EGR valve 38 are provided.

The EGR cooler 37 is a heat exchanger for cooling EGR gas by, for example, outside cooling air, cooling water, etc.

The EGR valve 38 is a solenoid valve enabling the opening degree to be adjusted continuously or in stages. This opening degree is controlled by the electronic control unit 200 in accordance with the engine operating state. By controlling the opening degree of the EGR valve 38, the flow of EGR gas recirculated to the intake collector 31a is adjusted.

The exhaust system 4 is a system for discharging the exhaust from the cylinders and is provided with an exhaust manifold 41, exhaust passage 42, and exhaust post treatment apparatus 43.

The exhaust manifold 41 is connected to an exhaust port 17 formed at the engine body 1 (see FIG. 2). The exhaust discharged from the cylinders 10 is introduced together into the exhaust passage 42.

At the exhaust passage 42, in order from the upstream side, a turbine 72 of the exhaust turbocharger 7 and an exhaust post treatment apparatus 43 are provided.

The turbine 72 is provided with a turbine housing 72a and the turbine wheel 72b arranged inside the turbine housing 72a. The turbine wheel 72b is driven to rotate by the energy of the exhaust flowing into the turbine housing 72a and drives the compressor wheel 71b attached coaxially to it.

The exhaust post treatment apparatus 43 is an apparatus for purifying the exhaust then discharging it to the outside air and is provided with various types of exhaust purification catalysts for removing harmful substances and a filter for trapping harmful substances etc.

The electronic control unit 200 is comprised of a digital computer provided with components connected with each other by a bidirectional bus 201 such as an ROM (read on memory) 202, RAM (random access memory) 203, CPU (microprocessor) 204, input port 205, and output port 206.

At the input port 205, in addition to the output signals of the above-mentioned relative position sensor 211, throttle sensor 212, air flow meter 213, intake pressure sensor 214, intake temperature sensor 215, etc., output signals from a water temperature sensor 216 for detecting the temperature of the cooling water for cooling the engine body 1 (below, referred to as the "cooling water temperature") etc. are input through corresponding AD converters 207. Further, at the input port 205, the output voltage of a load sensor 217 for generating an output voltage proportional to an amount of depression of an accelerator pedal 220 (below, referred to as the "amount of accelerator depression") is input through a corresponding AD converter 207. Further, at the input port 205, as a signal for calculating the engine rotational speed etc., the output signal of a crank angle sensor 218 generating an output pulse every time the crankshaft 14 of the engine body 1 rotates by for example 15° is input. In this way, at the input port 205, output signals of various types of sensors necessary for controlling the internal combustion engine 100 are input.

At the output port 206, through corresponding drive circuits 208, the fuel injectors 20 or spark plugs 15, the variable compression ratio mechanism A, the variable valve operation mechanism B, and other control parts are electrically connected.

The electronic control unit 200 outputs control signals for controlling the control parts from the output port 206 and controls the internal combustion engine 100 based on the output signals of the various types of sensors input from the input port 205.

Figure 3:
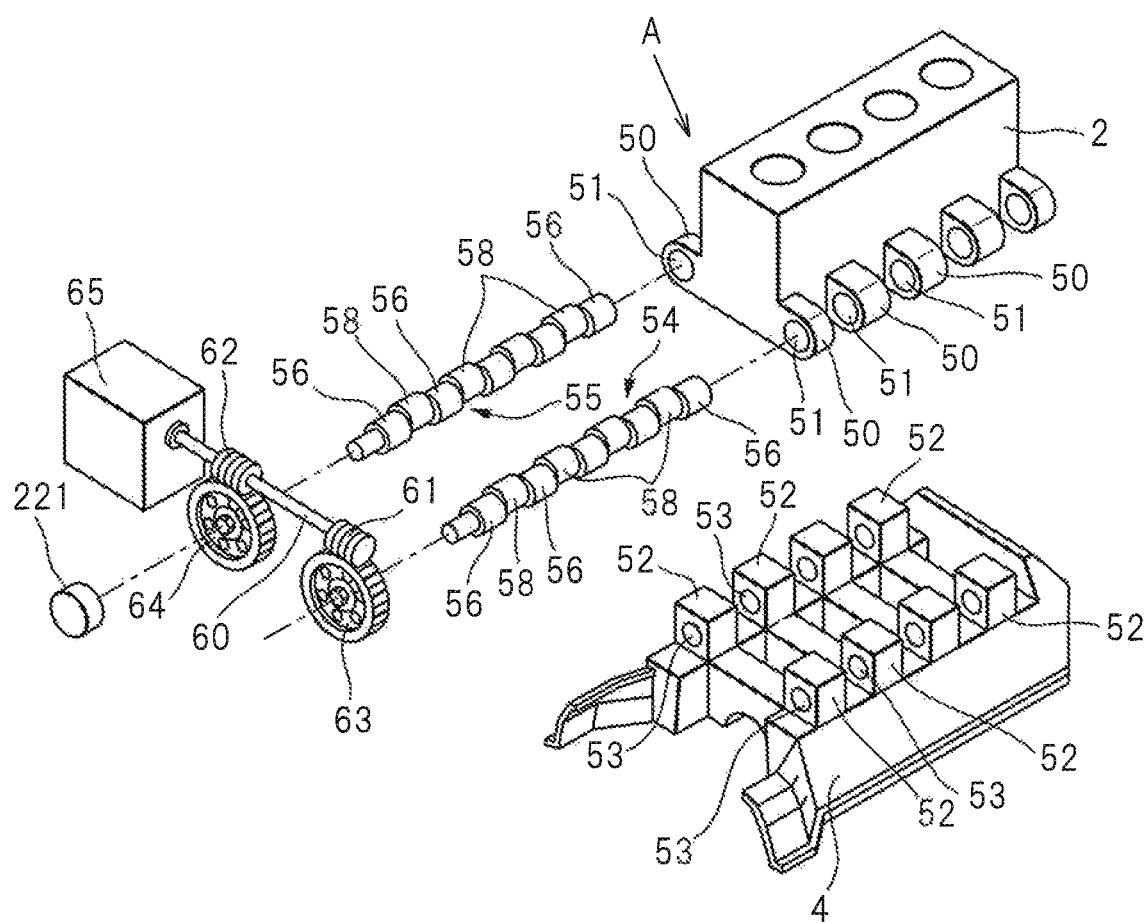
FIG. 3 is a disassembled perspective view of a variable compression ratio mechanism.

FIG. 3 is a disassembled perspective view of the variable compression ratio mechanism A according to the present embodiment.

As shown in FIG. 3, at the bottoms of the two side walls of the cylinder block 2, pluralities of projections 50 spaced apart from each other are formed. At these projections 50, circular cross-section cam insertion holes 51 are formed. On the other hand, at the top surface of the crankcase 4, pluralities of projections 52 spaced apart from each other and fitting between the corresponding projections 50 are formed. At these projections 52 as well, circular cross-section cam insertion holes 53 are formed.

Further, the variable compression ratio mechanism A is provided with a pair of camshafts 54 and 55. On the camshafts 54 and 55, circular cams 58 are fixed to be able to rotate inside the cam insertion holes 53 with predetermined clearances. These circular cams 58 are coaxial with the rotational axes of the camshafts 54 and 55. On the other hand, at the two sides of the circular cams 58, eccentric shafts 57 (see FIG. 4A to FIG. 4O) extend arranged eccentrically with respect to the rotational axes of the camshafts 54 and 55. On the eccentric shafts 57, separate circular cams 56 are attached to be able to rotate eccentrically. As shown in FIG. 3, these circular cams 56 are arranged at the two sides of the circular cams 58. These circular cams 56 are inserted to be able to rotate an the corresponding cam insertion holes 51.

At single end parts of the camshafts 54 and 55, worm wheels 63 and 64 engaging with a pair of worms 61 and 62 provided at a control shaft 60 are attached. The pair of worms 61 and 62 have opposite spiral directions so as to enable the camshafts 54 and 55 to be made to rotate in opposite directions. The control shaft 60 is made to rotate by the motor 65. By operating the motor 65 to make the camshafts 54 and 55 rotate in opposite directions, as shown in FIG. 3A to FIG. 3C, the volumes of the combustion chambers 11 when the pistons 12 are positioned at compression top dead center are changed. At the camshaft 55, a cam rotation angle sensor 221 generating an output signal expressing the rotational angle of the camshaft 55 is attached. The output signal of the cam rotation angle sensor 221 is input through the corresponding AD converter 207 to the electronic control unit 200. Below, referring to FIG. 4A to FIG. 4C, the operation of the variable compression ratio mechanism A will be explained.

Figure 4A:
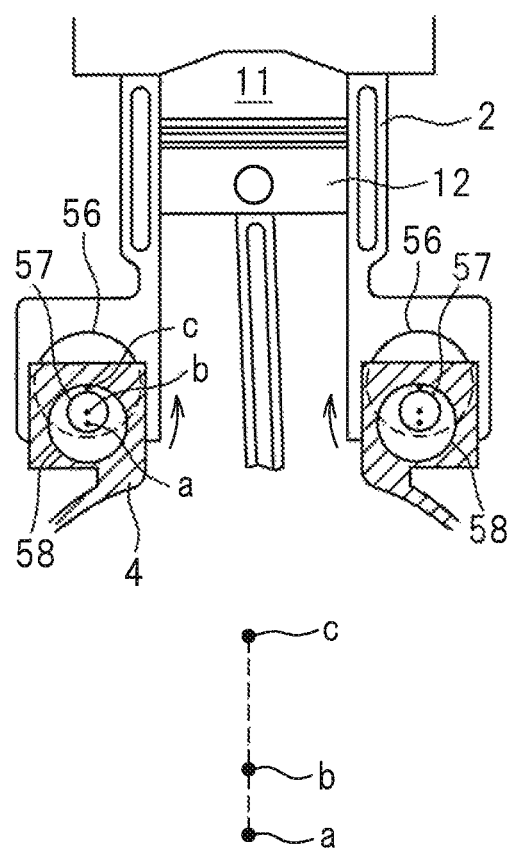
FIG. 4A is a view explaining operation of a variable compression ratio mechanism.

FIG. 4A to FIG. 4C are views explaining the operation of the variable compression ratio mechanism A.

FIG. 4A is a view of the state where the volume of a combustion chamber 11 when the piston 12 is positioned at compression top dead center is made the maximum by the variable compression ratio mechanism A, that is, the state where the mechanical compression ratio is made minimum. FIG. 4B is a view of the state where the volume of a combustion chamber 11 when the piston 12 is positioned at compression top dead center is made one between the maximum and minimum by the variable compression ratio mechanism A, that is, the state where the mechanical compression ratio is one between the minimum and the maximum. FIG. 4C is a view of the state where the volume of a combustion chamber 11 when the piston 12 is positioned at compression top dead center is made the minimum by the variable compression ratio mechanism A, that is, the state where the mechanical compression ratio is made the maximum.

If the circular cams 58 fixed on the camshafts 54 and 55 are made to rotate in opposite directions from each other from the state shown in FIG. 4A as shown by the arrows in FIG. 4A, the eccentric shafts 57 move in directions away from each other, so the circular cams 56 rotate in opposite directions from the circular cams 58 inside the cam insertion holes 51. Due to this, as shown in FIG. 4B, the positions of the eccentric shafts 57 change from high positions to intermediate height positions. Next, if making the circular cams 58 rotate in the directions shown by the arrows, as shown in FIG. 4C, the eccentric shafts 57 become the lowest positions.

Note that FIG. 4A to FIG. 4C show the positional relationship among a center "a" of a circular cam 58, a center "b" of an eccentric shaft 57, and a center "c" of a circular cam 56 in their respective states.

As will be understood from a comparison of FIG. 4A to FIG. 4C, the relative position of the crankcase 4 and the cylinder block 2 is determined by the distance between the center "a" of the circular cams 58 and the center "c" of the circular cams 56. The larger the distance between the center "a" of the circular cams 58 and the center "c" of the circular cams 56, the more the cylinder block 2 moves away from the crankcase 4. That is, the variable compression ratio mechanism A according to the present embodiment makes the relative position between the crankcase 4 and cylinder block 2 change by a crank mechanism using the rotating cams. If the cylinder block 2 separates from the crankcase 4, the volumes of the combustion chambers 11 increase when the pistons 12 are positioned at compression top dead center. In this way, by making the camshafts 54 and 55 rotate, it is possible to chance the volumes of the combustion chambers 11 when the pistons 12 are positioned at compression top dead center.

Note that, the variable compression ratio mechanism A shown in FIG. 2 and FIG. 3 shows one example. For example, it may also be made one provided with an upper link with one end connected with a piston through a piston pin, a lower link connected to the other end of the upper link and a crank pin of the crankshaft, a control shaft arranged substantially parallel to the crankshaft, and a control link with one end connected to the control shaft to be able to swing about it and with another end connected to the lower link and configured to make the control shaft turn by a motor so as to change the top dead center position of the piston and change the mechanical compression ratio.

Here, in the case, like in the present embodiment, of an internal combustion engine 110 provided with a variable compression ratio mechanism A and provided with an intake system 3 configured to be able to make EGR gas be recirculated to the cylinders 10, by making the EGR gas be recirculated to the cylinders 10, it is possible to lower the oxygen concentration in the combustion chambers 11 and lower the combustion temperature. For this reason, at the time of introduction of EGR gas where EGR gas is made to recirculate to the cylinders 10, it is possible to suppress the occurrence of knocking compared with the time of no introduction of EGR gas where EGR gas is not made to be recirculated to the cylinders 10.

Therefore, by making the EGR gas be recirculated to the cylinders 10, it is possible to operate the engine body 1 in the state raising the mechanical compression ratio compared with the time of no introduction of EGR gas. Due to this, it is possible to improve the heat efficiency and in turn the fuel economy. Further, by making the EGR gas be recirculated, the flow of the air passing through the throttle valve 36 (fresh air) decreases by exactly that amount, so it is necessary to enlarge the throttle opening degree to supply the necessary amount of air to the cylinders 10. For this reason, it is possible to reduce the pumping loss, so it is possible to further improve the heat efficiency and improve the fuel economy.

On the other hand, if making EGR gas be recirculated to the cylinders 10, combustion tends to become unstable due to the drop in oxygen concentration in the combustion chambers 11.

For this reason, in the present embodiment, the recirculation of the FUR gas is stopped in part of the operating region at the engine low load side where the amount of fuel injection is relatively small and combustion easily becomes unstable.

Therefore, if the engine operating state changes and shifts from an operating region where the EGR gas is made to be recirculated to the cylinders 10 (below, referred to as an "EGR gas introduction region") to an operating region at the engine low load side where EGR gas is not made to be recirculated to the cylinders 10 (below, referred to as an "EGR gas non-introduction region"), the EGR valve is controlled so that the EGR opening degree becomes zero (fully closed). However, even after fully closing the EGR valve 38, EGR gas remaining in the EGR passage 32 at the downstream side from the EGR valve 38 is for a short while introduced into the cylinders 10. For this reason, when shifting from an EGR gas introduction region to an EGR gas non-introduction region on the engine low load side, unnecessary EGR gas is transiently introduced into the cylinders 10 in an EGR gas non-introduction region, the combustion becomes unstable, and at the worst misfires are liable to occur.

As the method of stabilizing combustion here, raising the mechanical compression ratio may be mentioned. By raising the mechanical compression ratio, it is possible to raise the temperature of the air-fuel mixture in the combustion chambers 11 at the time of ignition (near compression top dead center) to improve the ignitability of the air-fuel mixture and possible to increase the speed of combustion as well.

Therefore, in the present embodiment, to secure stability of combustion when shifting from an EGR gas introduction region to an EGR gas non-introduction region at the engine low load side, the variable compression ratio mechanism A is controlled so as to not raise the mechanical compression ratio to the maximum value at the time of introduction of EGR gas but to set the EGR ratio to a relatively low value under conditions suppressing knocking and so as to raise the mechanical compression ratio at the time of no introduction of EGR gas. Due to this, it is possible to raise the mechanical compression ratio when shifting from an EGR gas introduction region to an EGR gas non-introduction region on the engine low load side, so it is possible to keep combustion from becoming unstable even if EGR gas is transiently introduced into the cylinders 10 at an EGR gas non-introduction region of the engine low load side.

FIG. 5 is a view showing a target compression ratio (solid line Y1) $t\varepsilon_{on}$ at the time of introduction of EGR gas in the present embodiment at a certain engine rotational speed and a target compression ratio (broken line) $t\varepsilon_{off}$ at the time of no introduction of EGR in accordance with the engine load. As shown in FIG. 5, in the present embodiment, the region where the engine load is less than a predetermined first load KL1 and the region where it is a predetermined second load KL2 or more are EGR gas non-introduction regions, while the region where it is the first load KL1 to less than the second load KL2 is an EGR gas introduction region.

Note that the one-dot chain line X1 of FIG. 5 shows an upper limit compression ratio (below, referred to as a "misfire prevention upper limit compression ratio") $\varepsilon_{lim}$ at the time of introduction of EGR gas able to keep combustion from becoming unstable and prevent misfires by raising the mechanical compression ratio to the maximum compression ratio $\varepsilon_{max}$ when the engine load changes from the state in an EGR gas introduction region where a steady operation with a constant engine load is being performed at a certain engine rotational speed (state where EGR rate is controlled to target EGR rate) and shifts to an EGR gas non-introduction region.

As shown in FIG. 5, in an operating region at the engine low load side, the target compression ratio $t\varepsilon_{on}$ at the time of introduction of EGR gas is made the misfire prevention upper limit compression ratio and the target compression ratio $t\varepsilon_{off}$ at the time of no introduction of EGR gas is made the maximum compression ratio $\varepsilon_{max}$. That is, in an operating region at the engine low load side, the target compression ratio $t\varepsilon_{on}$ at the time of introduction of EGR gas is set to a value smaller than the target compression ratio $t\varepsilon_{off}$ the time of no introduction of EGR gas. Due to this, when the operation shifts from an EGR gas introduction region to an EGR gas non-introduction region at the engine low load side, it is possible to raise the mechanical compression ratio, so it is possible to keep the combustion from becoming unstable.

On the other hand, at an operating region of the engine high load side, to prevent knocking, it is necessary to lower the mechanical compression ratio along with the increase of the engine load. For this reason, in an operating region of the engine high load side, along with an increase of the engine load, the target compression ratio $t\varepsilon_{on}$ at the time of introduction of EGR gas is made to gradually fall from the misfire prevention upper limit compression ratio $\varepsilon_{lim}$, while the target compression ratio $t\varepsilon_{off}$ at the time of no introduction of EGR gas is also made to gradually fall from the maximum compression ratio $\varepsilon_{max}$. At this time, as explained above, at the time of introduction of EGR gas, it is possible to suppress knocking more than at the time of no introduction of EGR gas, so it is possible to operate the engine body 1 in the state making the mechanical compression ratio higher than at the time of no introduction of EGR gas. For this reason, in an operating region of the engine high load side, the target compression ratio $t\varepsilon_{on}$ at the time of introduction of EGR gas is set to a value larger than the target compression ratio $t\varepsilon_{off}$ at the time of no introduction of EGR gas.

Figure 6:
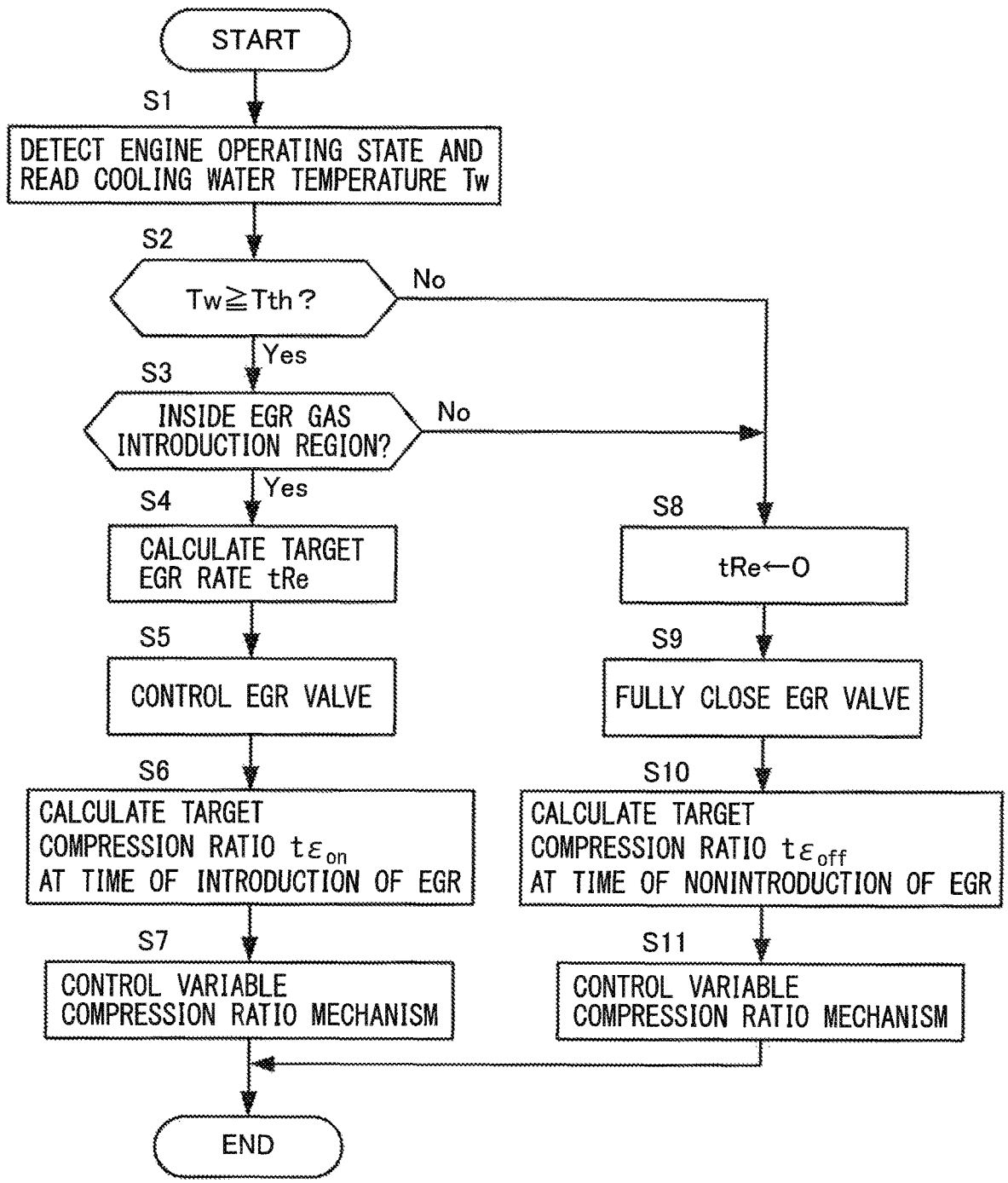
FIG. 6 is a flow chart explaining compression ratio control according to a first embodiment of the present disclosure.

FIG. 6 is a flow chart explaining compression ratio control according to the present embodiment.

At step S1, the electronic control unit 200 reads the engine load detected by the load sensor 217 and the engine rotational speed calculated based on the output signal of the crank angle sensor 218 and detects the engine operating state. Further, the electronic control unit 200 reads the cooling water temperature detected by the water temperature sensor 216.

At step S2, the electronic control unit 200 judges if the cooling water temperature is a predetermined EGR gas introduction permission water temperature Tth or more. The electronic control unit 200 proceeds to the processing of step S3 if the cooling water temperature is the EGR gas introduction permission water temperature Tth or more. On the other hand, the electronic control unit 200 proceeds to the processing of step S8 if the cooling water temperature is less than the EGR gas introduction permission water temperature Tth.

At step S3, the electronic control unit 200 judges if the operating region is in an EGR gas introduction region, that is, if the engine load is a first load KL1 to less than a second load KL2. The electronic control unit 200 proceeds to the processing of step S4 if the operating region is in an EGR gas introduction region. On the other hand, the electronic control unit 200 proceeds to the processing of step S8 if the operating region is in an EGR gas non-introduction region. Note that, in the present embodiment, in this way, the threshold values for judging if the operating region is in an EGR gas introduction region, that is, the values of the first load KL1 and second load KL2, are made constant (fixed values), but for example the value of the first load KL1 or second load KL2 may also be made to change in accordance with the engine rotational speed.

Figure 7:
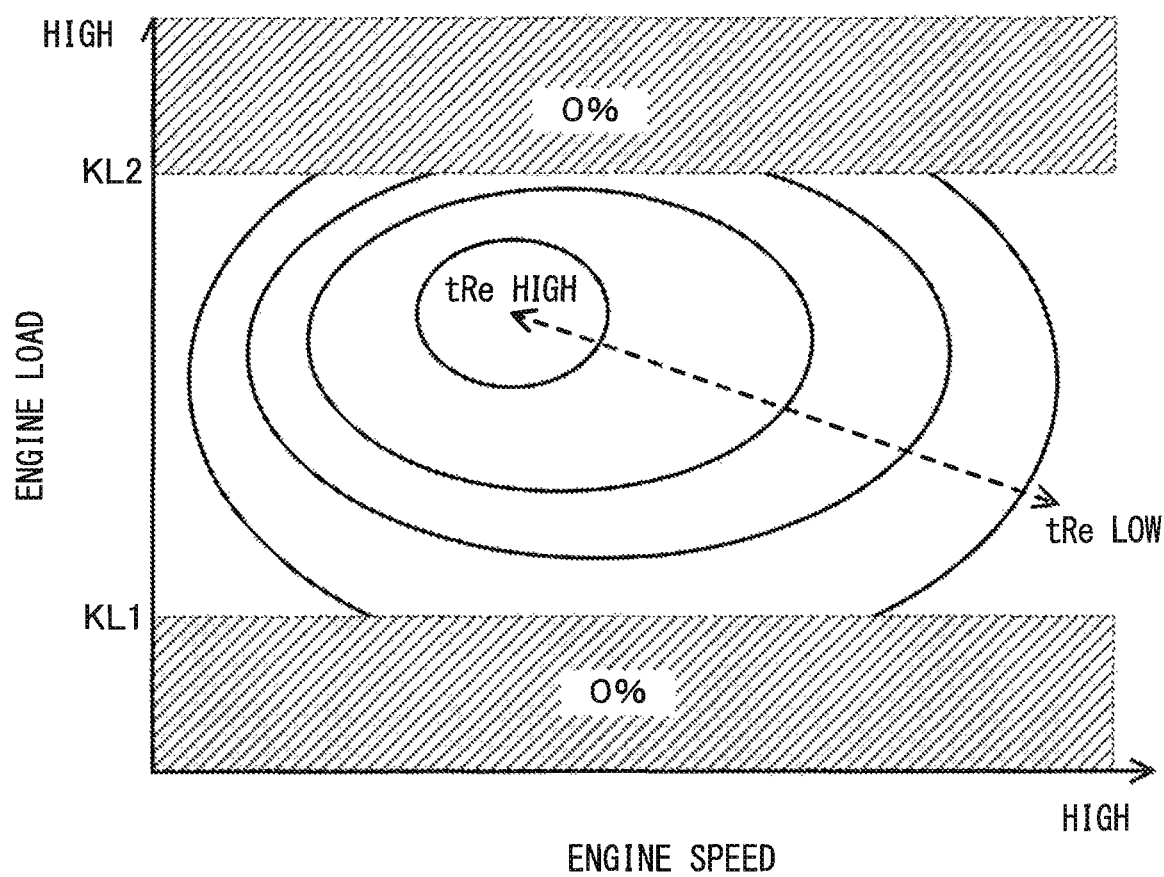
FIG. 7 is a target EGR rate calculation map for calculating a target EGR rate tRe based on an engine operating state.

At step S4, the electronic control unit 200 refers to a target EGR rate calculation map of FIG. 7 prepared in advance by experiments etc. and calculates the target EGR rate tRe, based on the engine operating state.

At step S5, the electronic control unit 200 controls the opening degree of the EGR valve 38 so that the EGR rate becomes a target EGR rate tRe.

At step S6, the electronic control unit 200 refers to the above-mentioned table of FIG. 5 and calculates a target compression ratio $t\varepsilon_{off}$ at the time of introduction of EGR based on the engine load. Note that a plurality of tables of FIG. 5 are prepared for the different engine rotational speeds. The electronic control unit 200 selects the optimum table corresponding to the engine rotational speed from among them, then calculates the target compression ratio at the time of introduction of EGR based on the engine load.

At step S7, the electronic control unit 200 controls the variable compression ratio mechanism A so that mechanical compression ratio becomes the target compression ratio $t\varepsilon_{on}$ at the time of introduction of EGR.

At step S8, the electronic control unit 200 makes the target EGR rate 0 [%].

At step S9, the electronic control unit 200 controls the EGR valve 38 so that the EGR rate becomes the target EGR rate tRe, that is, so that the opening degree of the EGR valve 38 becomes fully closed.

At step S10, the electronic control unit 200 refers to the above-mentioned table of FIG. 5 (optimum table corresponding to engine rotational speed) and calculates the target compression ratio $t\varepsilon_{off}$ at the time of no introduction of EGR based on the engine load.

At step S11, the electronic control unit 200 controls the variable compression ratio mechanism A so that the mechanical compression ratio becomes the target compression ratio $t\varepsilon_{off}$ at the time of no introduction of EGR.

Figure 8:
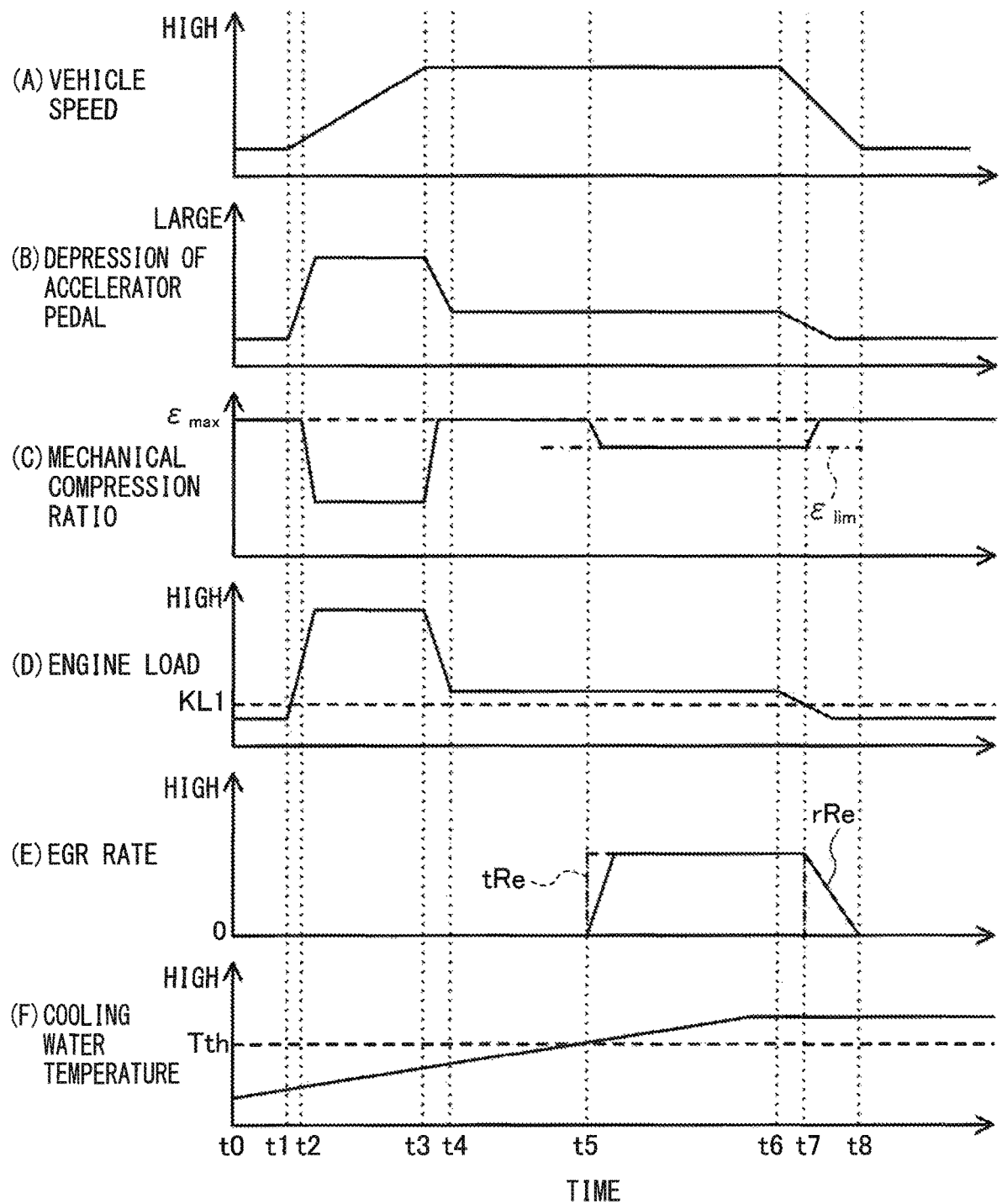
FIG. 8 is a time chart explaining operation of compression ratio control according to the first embodiment of the present disclosure.

FIG. 8 is a time chart explaining operation of compression ratio control according to the present embodiment.

In the example shown in FIG. 8, from the time t0 to the time t5, the cooling water temperature Tw becomes less than the EGR gas introduction permission water temperature Tth. For this reason, the electronic control unit 200 sets the target EGR rate tRe at 0 [%] and fully closes the EGR valve 38 from the time t0 to the time t5 and controls the variable compression ratio mechanism A so that the mechanical compression ratio becomes the target compression ratio $t\varepsilon_{off}$ at the time of no introduction of EGR gas.

Specifically, from the time t0 to the time a steady operation with a constant engine load is performed at an EGR gas non-introduction region. For this reason, the electronic control unit 200 calculates the target compression ratio $t\varepsilon_{off}$ at the time of no introduction of EGR based on the engine load. In the present embodiment, the target compression ratio $t\varepsilon_{off}$ at the time of no introduction of EGR at an EGR gas non-introduction region is set to the maximum compression ratio $\varepsilon_{max}$, so from the time t0 to the time t1, the mechanical compression ratio is controlled to the maximum compression ratio $\varepsilon_{max}$.

If, at the time t1, the accelerator pedal is depressed more for acceleration, the engine load increases and the operation shifts to an EGR gas introduction region at the engine high load side, but until the time t5, the target compression ratio $t\varepsilon_{off}$ at the time of no introduction of EGR gas is calculated based on the engine load. As a result, at the time t2 on, along with an increase of the engine load, the target compression ratio $t\varepsilon_{off}$ at the time of no introduction of EGR gas falls from the maximum compression ratio $\varepsilon_{max}$, so the electronic control unit 200 controls the variable compression ratio mechanism A so that the mechanical compression ratio becomes that fallen target compression ratio $t\varepsilon_{off}$ at the time of no introduction of EGR gas.

Further, at the time t3, the acceleration ends and the accelerator pedal is released, so the engine load decreases. Along with this, the mechanical compression ratio is returned to the maximum compression ratio From the time t4 to the time 6, steady operation with a constant engine load is performed at an EGR gas introduction region at the engine low load side.

At this time, until the time t5, the cooling water temperature Tw becomes less than the EGR gas introduction permission water temperature Tth, so the target compression ratio $t\varepsilon_{off}$ at the time of no introduction of EGR gas is calculated based on the engine load and the mechanical compression ratio is maintained at the maximum compression ratio $\varepsilon_{max}$.

Further, if at the time t5 the cooling water temperature Tw becomes the EGR gas introduction permission water temperature Tth or more, the engine body 1 is operated at an EGR gas introduction region at the engine low load side, so the electronic control unit 200 calculates the target EGR rate tRe in accordance with the engine operating state and controls the EGR valve 38 so that the EGR rate becomes the target EGR rate tRe.

Further, the electronic control unit 200 calculates the target compression ratio $t\varepsilon_{on}$ at the time of introduction of EGR gas based on the engine load. In the present embodiment, the target compression ratio $t\varepsilon_{on}$ at the time of introduction of EGR gas at an EGR gas introduction region at the engine low load side is set to a misfire prevention upper limit compression ratio $\varepsilon_{lim}$ lower than the maximum compression ratio $\varepsilon_{max}$. For this reason, the electronic control unit 200 controls the variable compression ratio mechanism. A so that at the time t5 the mechanical compression ratio becomes the misfire prevention upper limit compression ratio $\varepsilon_{lim}$ and lowers the mechanical compression ratio from the maximum compression ratio $\varepsilon_{max}$ to the misfire prevention upper limit compression ratio $\varepsilon_{lim}$.

Here, at an EGR gas introduction region at the engine low load side, if operating the engine body 1 in a state with the mechanical compression ratio made higher than the misfire upper limit compression ratio εlim, it is possible to increase the low of EGR gas to be recirculated by exactly the amount by which the mechanical compression ratio is raised (that is, it is possible to set the target EGR rate tRe at a high value). For this reason, it is possible to reduce the pumping loss, so from the viewpoint of fuel economy, it is considered better to make the mechanical compression ratio higher than the misfire upper limit compression ratio slim at an EGR gas introduction region at the engine low load side.

However, if, at the time t6, the accelerator pedal is released for deceleration and the engine load further falls and, at the time t7, the operation shifts to an EGR gas non-introduction region, the target EGR rate tRe is set to 0 [%] and the EGR valve 38 is made to fully close. At this time, even after making the EGR valve 38 fully closed, the EGR gas remaining in the EGR passage 32 at the downstream side from the EGR valve 38 is, for a short while, introduced into the cylinders 10. That is, a time lag occurs until the actual EGR rate (below, referred to as the "actual EGR rate") converges at the target EGR rate tRe. For this reason, from the time t7 to the time t8, in the EGR gas non-introduction region, EGR gas is transiently introduced into the cylinders 10 and combustion becomes unstable.

Therefore, if ending up operating the engine body 1 in the state raising the mechanical compression ratio higher than the misfire upper limit compression ratio εlim in an EGR gas introduction region of the engine low load side, when shifting to an EGR gas non-introduction region of the engine low load side, there is no longer a means for securing the stability of combustion and at the worst case misfires end up occurring.

Therefore, in the present embodiment, in an EGR gas introduction region, the mechanical compression ratio is limited to the misfire upper limit compression ratio $\varepsilon_{lim}$, while at the time t7 when shifting from an EGR gas introduction region to an EGR gas non-introduction region at the engine low load side, the mechanical compression ratio can be raised to the maximum compression ratio $\varepsilon_{max}$. Due to this, it is possible to secure the stability of combustion when shifting from an EGR gas introduction region to an EGR gas non-introduction region.

According to the present embodiment explained above, there is provided an electronic control unit 200 (control device) for controlling an internal combustion engine provided with an engine body, a variable compression ratio mechanism configured to be able to change a mechanical compression of the engine body, and an intake system 3 configured to be able to make exhaust discharged from combustion chambers of the engine body be recirculated to an intake passage of the engine body. The electronic control unit 200 (control device) is provided with a compression ratio control part controlling the variable compression ratio mechanism so that the mechanical compression ratio becomes the target compression ratio.

Further, the compression ratio control part is configured to set the target compression ratio to a lower value when exhaust is being recirculated at a predetermined operating region at the engine low load side compared with when exhaust is not being recirculated.

Due to this, when making the recirculation of exhaust stop from the state of making exhaust be recirculated at the engine low load side, the target compression ratio is changed from a relatively low value to a high value and the mechanical compression ratio is raised by the variable compression ratio mechanism A. For this reason, it is possible to keep combustion from transiently becoming unstable due to EGR gas introduced into the cylinders 10 and remaining in the EGR passage 32 even after stopping recirculation of exhaust.

Further, the compression ratio control part according to the present embodiment is further configured so as to set the target compression ratio at a higher value when exhaust is being recirculated at a predetermined operating region at the engine high load side compared with when exhaust is not being recirculated.

Due to this, in an operating region at the engine high load side where knocking occurs relatively easily, it is possible to perform recirculation of exhaust to keep down the occurrence of knocking while raising the mechanical compression ratio over the time when stopping recirculation of exhaust to operate the engine body 1. By raising the mechanical compression ratio over the time when stopping recirculation of exhaust in this way, it is possible to improve the heat efficiency and in turn the fuel economy over the time when stopping recirculation of exhaust. Further, the pumping loss can also be reduced, so it is possible to further improve the heat efficiency and improve the fuel economy.

Second Embodiment

Next, a second embodiment of the present disclosure will be explained. The present embodiment differs from the first embodiment in the content of the compression ratio control on the point of correcting the target compression ratio $t\varepsilon_{on}$ at the time of introduction of EGR gas based on the actual EGR rate rRe. Below, this point of difference will be focused on in the explanation.

Figure 9:
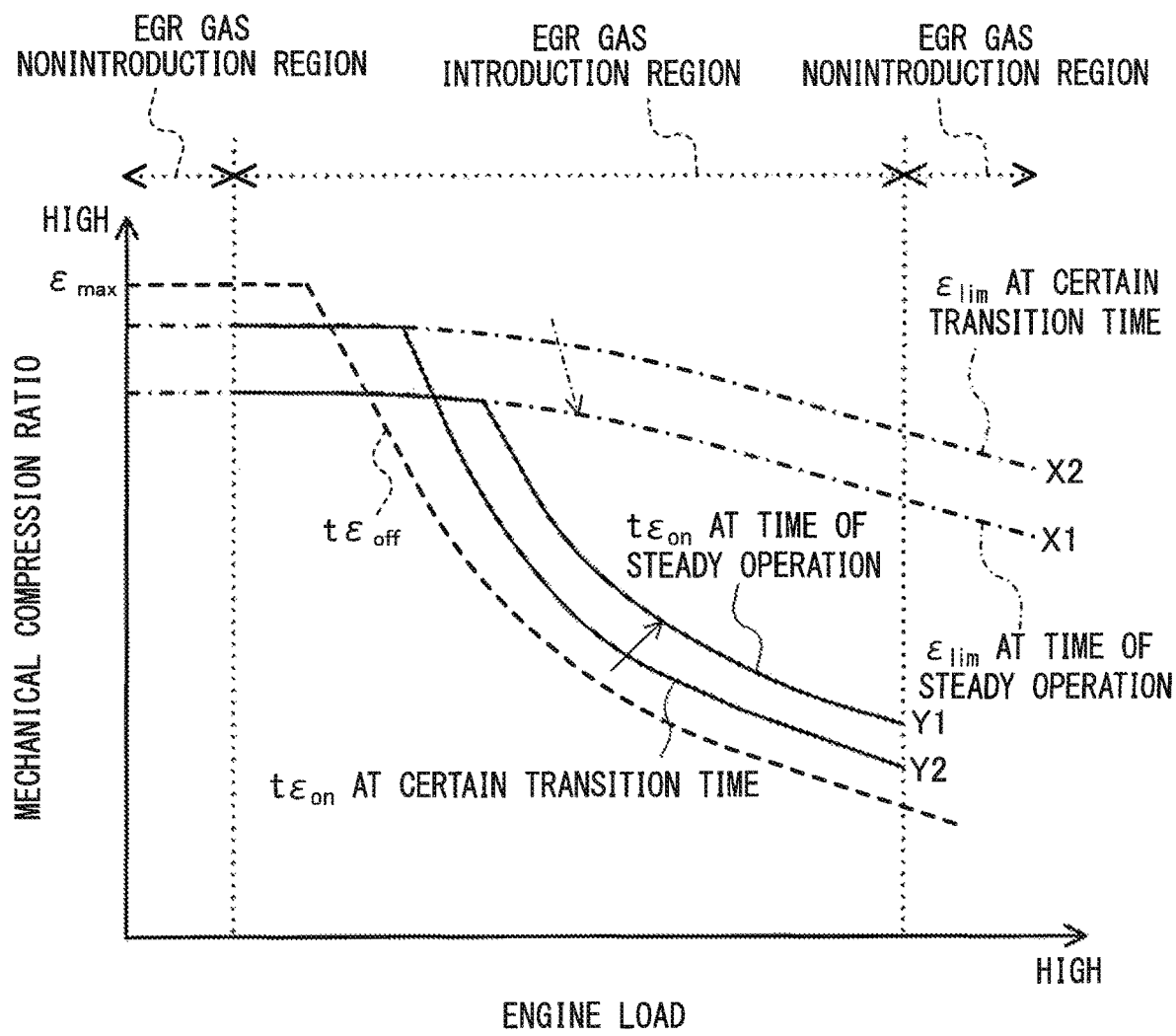
FIG. 9 is a view explaining the content of compression ratio control according to a second embodiment of the present disclosure.

FIG. 9 is a view explaining the content of compression ratio control according to the present embodiment.

In the above-mentioned first embodiment, the control device referred to the table of FIG. 5 provided for each engine rotational speed and calculated the target compression ratio $t\varepsilon_{on}$ at the time of introduction of EGR gas or target compression ratio $t\varepsilon_{off}$ at the time of no introduction of EGR gas based on the engine load. Further, at the engine low load side, to prevent misfire at the time of deceleration, it limited the target compression ratio $t\varepsilon_{on}$ at the time of introduction of EGR gas to a misfire prevention upper limit compression ratio $\varepsilon_{lim}$.

Here, in FIG. 5 and FIG. 9, the misfire prevention upper limit compression ratio $\varepsilon_{lim}$ shown by the one-dot chain line X1 is the upper limit of the mechanical compression ratio at the time of introduction of EGR gas enabling the prevention of misfires by raising the mechanical compression ratio to the maximum compression ratio $\varepsilon_{max}$ when the engine load changes from a state where a steady operation of a constant engine load is being performed at a certain engine rotational speed in an EGR gas introduction region (state where the actual EGR rate is controlled to the target EGR rate) and shifts to an EGR gas non-introduction region at the engine low load side.

When the operation shifts from the EGR gas non-introduction region at the engine low load side or engine high load side to the EGR gas introduction region, the EGR valve 38 opens and EGR gas is introduced into the cylinders 10, but a time lag occurs until the actual EGR rate rRe increases and converges at the target EGR rate tRe. For this reason, until the actual EGR rate rRe converges at the target EGR rate tRe, the amount of EGR gas introduced into the cylinders 10 transiently becomes smaller than the target amount. Further, the amount of EGR gas present in the EGR passage 32 at the downstream side from the EGR valve 38 also becomes smaller compared with the time of steady operation.

For this reason, even if the engine load further falls and the operation shifts to an EGR gas non-introduction region at the engine low load side before the actual EGR rate rRe increases and converges at the target EGR rate tRe, the amount of EGR gas introduced into the cylinders 10 transiently becomes smaller compared with the time of steady operation. That is, at the time of transition until the actual EGR rate rRe increases and converges at the target EGR rate tRe, the state becomes one which is more resistant to misfire than when shifting from the time of steady operation after the actual EGR rate rRe converges at the target EGR rate tRe to the EGR gas non-introduction region at the engine low load side.

Therefore, as shown by the one-dot chain line X2 in FIG. 9, when shifting from an EGR gas non-introduction region to the EGR gas introduction region at the engine low load side or engine high load side until the actual EGR rate rRe increases and converges at the target EGR rate tRe, the misfire prevention upper limit compression ratio $\varepsilon_{lim}$ becomes higher than the misfire prevention upper limit compression ratio $\varepsilon_{lim}$ at the time of steady operation shown by the one-dot chain line X1. Further, the transitionally increased misfire prevention upper limit compression ratio $\varepsilon_{lim}$ converges at the misfire prevention upper limit compression ratio $\varepsilon_{lim}$ at the time of steady operation shown by the one-dot chain line X1 as the actual EGR rate rRe increases and converges at the target EGR rate tRe.

Further, the target compression ratio $t\varepsilon_{on}$ at the time of introduction of EGR gas shown by the solid line Y1 in FIG. 5 and FIG. 9 is the optimum mechanical compression ratio where knocking and misfire are avoided and the fuel economy becomes the best in a state of steady operation at a constant engine load at a certain engine rotational speed.

As explained above, when shifting from an EGR gas non-introduction region to an EGR gas introduction region, until the actual EGR rate rRe converges at the target EGR rate tRe, the amount of EGR gas introduced into each cylinder 10 transiently becomes smaller than the target amount. For this reason, at the time of transition until the actual EGR rate rRe increases and converges at the target EGR rate tRe, the cylinder environment becomes one where knocking occurs more easily than the time of steady operation after the actual EGR rate rRe converges to the target EGR rate tRe.

Therefore, as shown by the solid line Y2 in FIG. 9, when shifting from an EGR gas non-introduction region to an EGR gas introduction region, until the actual EGR rate rRe increases and converges at the target EGR rate tRe, at the engine high load side, the optimum mechanical compression ratio transiently becomes lower than the target compression ratio $t\varepsilon_{on}$ at the time of introduction of EGR gas at the time of steady operation shown by the solid line Y1. Further, at the engine low load side, as shown by the one-dot chain line X2, the misfire prevention upper limit compression ratio $\varepsilon_{lim}$ becomes higher, so the optimum mechanical compression ratio transiently becomes higher than the target compression ratio $t\varepsilon_{on}$ at the time of introduction of EGR gas at the time of steady operation shown by the solid line Y1. Further, the optimum mechanical compression ratio converges at the target compression ratio $t\varepsilon_{on}$ at the time of introduction of EGR gas shown by the solid line Y1 as the actual EGR rate rRe increases and converges at the target EGR rate tRe.

In this way, when shifting from an EGR gas non-introduction region to an EGR gas introduction region until the actual EGR rate rRe increases and converges at the target EGR rate tRe, the optimum mechanical compression ratio where knocking and misfires are avoided while the fuel economy becomes the best transiently changes in accordance with the actual EGR rate.

Therefore, the present embodiment corrects the target compression ratio $t\varepsilon_{on}$ at the time of introduction of EGR gas based on the actual EGR rate rRe until the actual EGR rate rRe increases and converges at the target EGR rate tRe. Below, compression ratio control based on the present embodiment will be explained.

Figure 10:
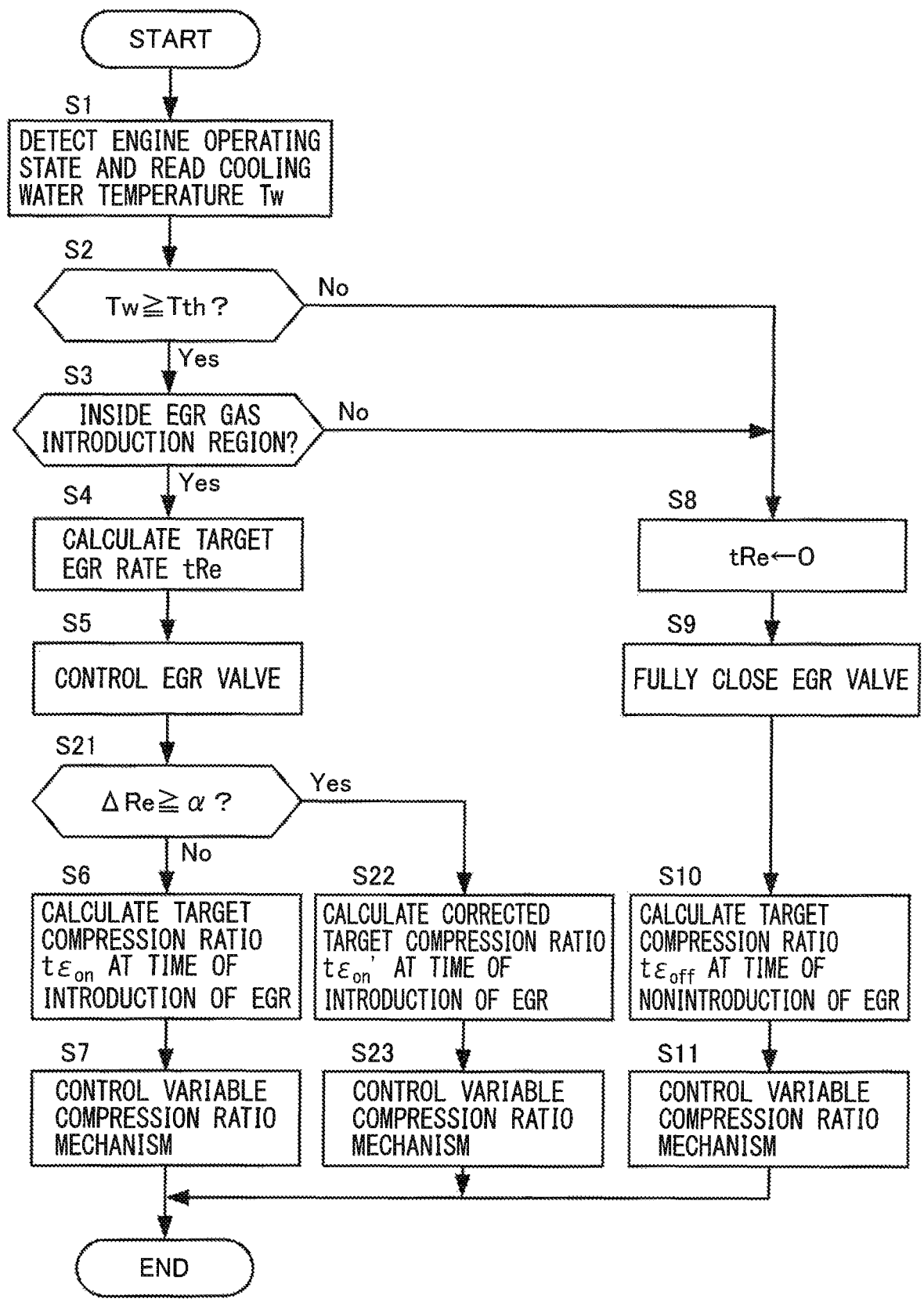
FIG. 10 is a flow chart explaining compression ratio control according to the second embodiment of the present disclosure.

FIG. 10 is a flow chart explaining compression ratio control according to the present embodiment performed by the electronic control unit 200. Note that the processing from step S1 to step S11 of FIG. 10 performs processing similar to the first embodiment so the explanation will be omitted here.

At step S21, the electronic control unit 200 judges if the time is a transient time where the operation shifts from an EGR gas non-introduction region to an EGR gas introduction region until the actual EGR rate rRe increases and converges at the target EGR rate tRe.

Specifically, the electronic control unit 200 estimates the actual EGR rate rRe at the time of transition and judges if the difference ΔRe of the target EGR rate tRe minus the actual EGR rate rRe is a predetermined value α or more. Note that the method of estimation of the actual EGR rate rRe may be one suitably selected from among the various known methods, but the present embodiment judges the actual EGR rate rRe based on the engine operating state, the intake pressure, etc. Further, the predetermined value α is a value where it can be judged that the actual EGR rate rRe is converging at the target EGR rate tRe if the difference ΔRe is less than the predetermined value α, that is, a value where it can be judged that the difference between the actual EGR rate rRe and the target EGR rate tRe is sufficiently small and it is the time of steady operation, and can be freely set. The electronic control unit 200 proceeds to the processing of step S23 if the difference ΔRe is a predetermined value α or more. On the other hand, the electronic control unit 200 proceeds to the processing of step S6 if the difference ΔRe is less than the predetermined value α.

At step S22, the electronic control unit 200 calculates the corrected target compression ratio $t\varepsilon_{on}'$ at the time of introduction of EGR gas based on the actual EGR rate rRe. In the present embodiment, the electronic control unit 200 corrects the above-mentioned table of FIG. 5 based on the actual EGR rate rRe and refers to the corrected table to calculate the corrected target compression ratio at the time of introduction of EGR gas based on the engine load.

Figure 11:
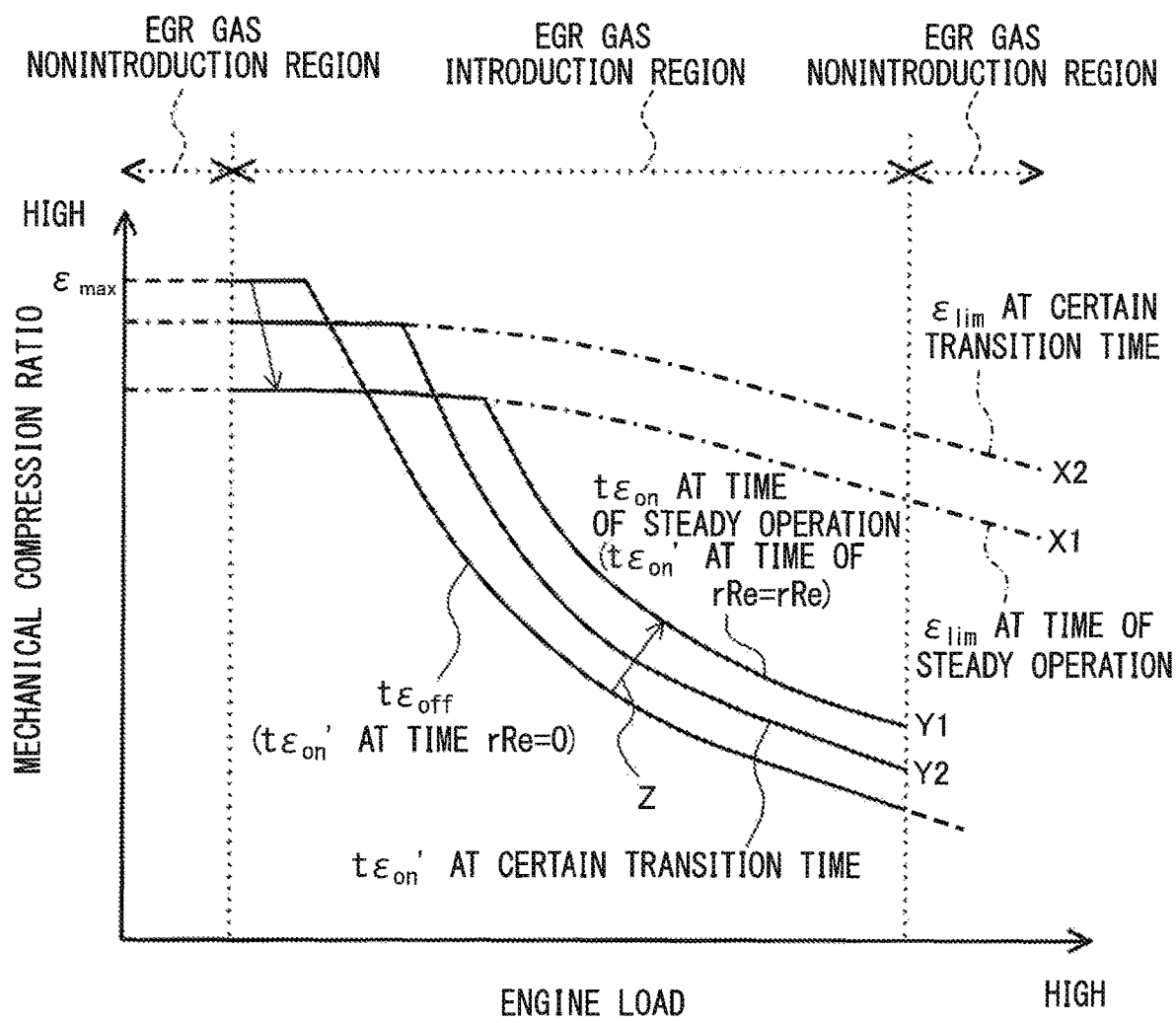
FIG. 11 is a view explaining a method of correction of a target compression ratio $t\varepsilon_{off}$ at the time of no introduction of EGR gas.

Specifically, the electronic control unit 200, as shown in FIG. 11, corrects the table of FIG. 5 so that the corrected target compression ratio $t\varepsilon_{on}'$ at the time of introduction of EGR gas becomes the target compression ratio $t\varepsilon_{off}$ at the time of no introduction of EGR gas when the actual EGR rate rRe right after the EGR valve 38 opens is zero [%].

Further, along with the increase of the actual EGR rate rRe, the table of FIG. 5 is corrected as shown by the arrow Z of FIG. 11 so that the correction ends when the actual EGR rate rRe becomes the target EGR rate tRe (so that the corrected target compression ratio $t\varepsilon_{on}'$ at the time of introduction of EGR gas becomes the target compression ratio $t\varepsilon_{on}$ at the time of introduction of EGR gas at the time of steady operation).

That is, until the actual EGR rate rRe converges at the target EGR rate tRe, the table of FIG. 5 is corrected so that at the engine low load side, the lower the actual EGR rate rRe, the higher the corrected target compression ratio at the time of introduction of EGR gas becomes compared with the target compression ratio $t\varepsilon_{on}$ at the time of introduction of EGR gas at the time of steady operation. Further, the table of FIG. 5 is corrected so that at the engine high load side, the lower the actual EGR rate rRe, the lower the corrected target compression ratio $t\varepsilon_{on}'$ at the time of introduction of EGR gas becomes compared with the target compression ratio $t\varepsilon_{on}$ at the time of introduction of EGR gas at the time of steady operation.

At step S23, the electronic control unit 200 controls the variable compression ratio mechanism A so that the mechanical compression ratio becomes the corrected target compression ratio $t\varepsilon_{on}'$ at the time of introduction of EGR gas.

Figure 12:
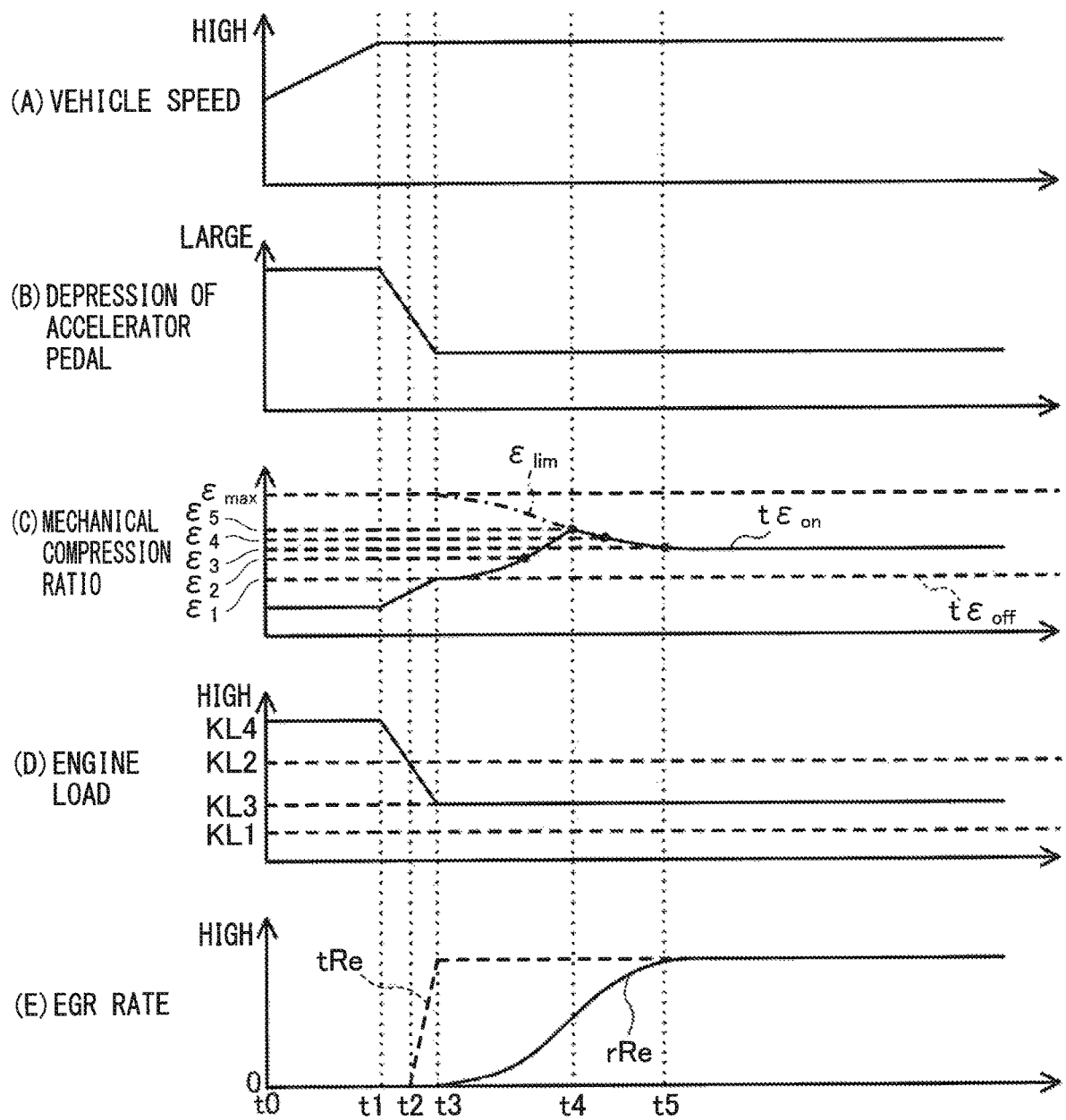
FIG. 12 is a time chart explaining operation of compression ratio control according to the second embodiment of the present disclosure.
Figure 13:
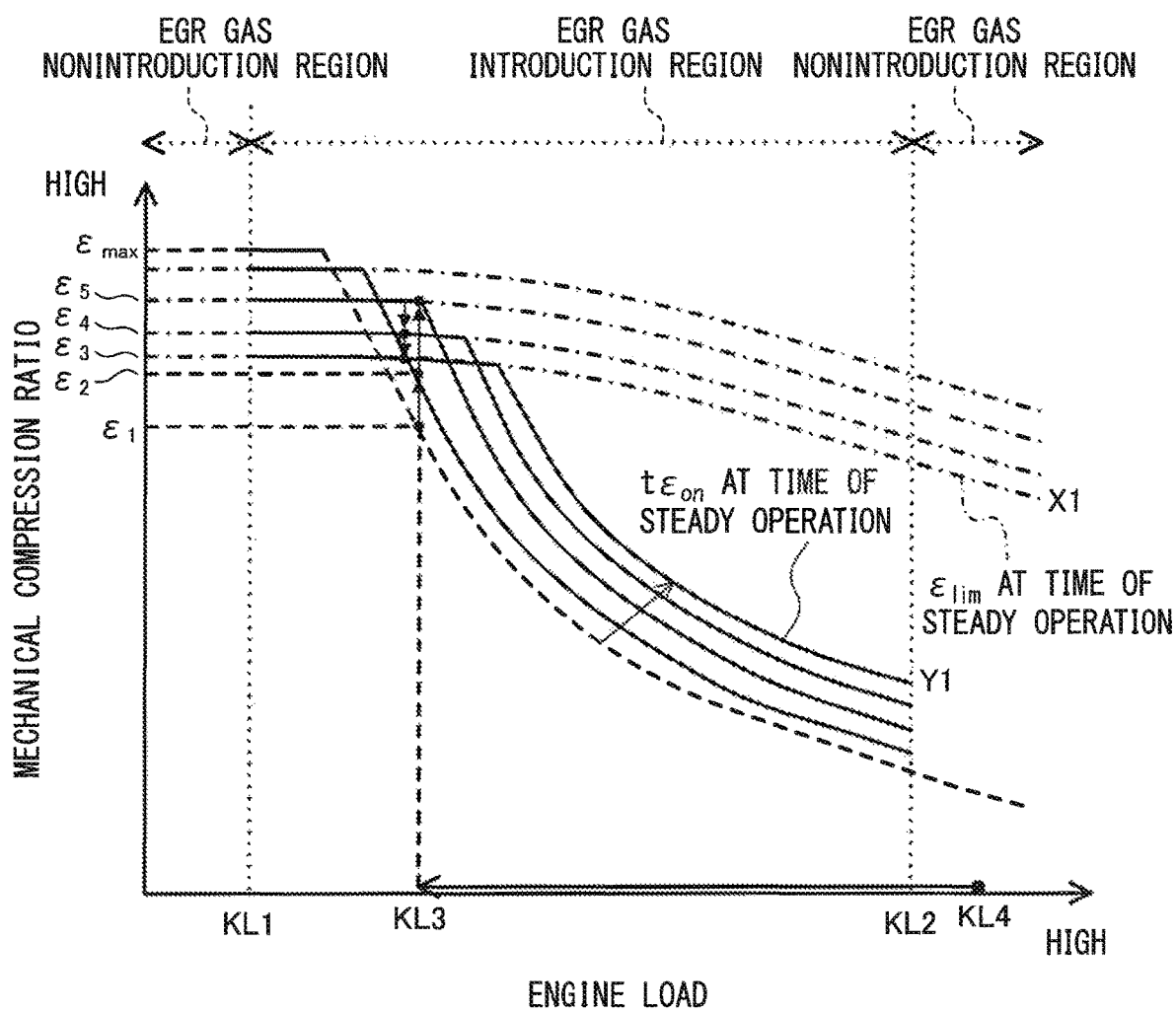
FIG. 13 is a view explaining compression ratio control according to the second embodiment of the present disclosure.

FIG. 12 is a time chart explaining operation of compression ratio control according to the present embodiment, in particular, is a time chart of when, as shown in FIG. 13, the engine load falls from a fourth load KL4 at an EGR gas non-introduction region at the engine high load side to a third load KL3 of an EGR gas introduction region.

From the time t0 to the time t1, the accelerator pedal is deeply depressed for acceleration. In the EGR gas non-introduction region at the engine high load side, steady operation with a constant engine load (fourth load KL4) is performed.

At the time t1, acceleration ends and the accelerator pedal is released whereby the engine load decreases. If at the time t2 the engine load falls below the second load KL2, the electronic control unit 200 calculates the target EGR rate tRe according to the engine operating state and controls the EGR valve 38 so that the actual EGR rate rRe becomes the target EGR rate tRe. Due to this, the EGR valve 38 is opened. From the time t2 on, the actual EGR rate rRe gradually rises toward the target EGR rate tRe. At the time t5, the actual EGR rate rRe converges at the target EGR rate tRe.

In the present embodiment, from this time t2 to the time t5, the corrected target compression ratio $t\varepsilon_{on}'$ at the time of introduction of EGR gas is calculated based on the actual EGR rate.

Specifically, from the time t2 to the time t3, the actual EGR rate rRe becomes zero, so the corrected target compression ratio at the time of introduction of EGR gas matches the target compression ratio $t\varepsilon_{off}$ at the time of no introduction of EGR gas. As shown in FIG. 12 and FIG. 13, the corrected target compression ratio $t\varepsilon_{on}'$ at the time of introduction of EGR gas is set to ε1. Further, along with the increase of the actual EGR rate, the corrected target compression ratio $t\varepsilon_{on}'$ at the time of introduction of EGR gas is for example successively set to ε2, ε5, ε4, and ε3 and the variable compression ratio mechanism A is controlled so that the mechanical compression ratio becomes the set corrected target compression ratio $t\varepsilon_{on}'$ at the time of introduction of EGR gas.

At this time, until the time t4 when the upper limit of the mechanical compression ratio is limited by the misfire prevention upper limit compression ratio εlim, the corrected target compression ratio $t\varepsilon_{on}'$ at the time of introduction of EGR gas increases. Further, at the time t4 on, the corrected target compression ratio $t\varepsilon_{on}'$ at the time of introduction of EGR gas falls.

Further, at the time of the time t5 when the actual EGR rate rRe converges at the target EGR rate tRe and on, the variable compression ratio mechanism A is controlled so that the mechanical compression ratio becomes the target compression ratio $t\varepsilon_{on}$ at the time of introduction of ESP gas at the time of steady operation.

The electronic control unit 200 (control device) according to the present embodiment explained above is provided with an exhaust recirculation control part controlling the intake system 3 so that the ESP rate (exhaust recirculation rate) becomes the target EGR rate (target recirculation rate) tRe and an actual recirculation rate estimating part estimating an actual EGR rate (actual recirculation rate) rRe. Further, the compression ratio control part is configured to correct the target compression ratio based on the actual EGR rate rRe until the actual ESP rate rRe increases and converges at the target ESP rate tRe when starting recirculation of exhaust.

Specifically, the compression ratio control part corrects the target compression ratio to become higher in a predetermined operating region at the engine low load side the lower the actual EGR rate rRe from the target EGR rate tRe and corrects the target compression ratio to become lower in a predetermined operating region at the engine high load side.

Due to this, at the time of transition when shifting from an EGR Gas non-introduction region to an EGR gas introduction region until the actual EGR rate rRe increases and converges at target EGR rate tRe, it is possible to control the mechanical compression ratio to the optimum mechanical compression ratio where knocking and misfire are avoided and the fuel economy becomes the best.

Note that as a modification of the second embodiment, by correcting the target intake valve closing timing (below, referred to as "IVC") based on the actual EGR rate rRe when further controlling the variable valve operation mechanism B so that the IVC becomes a target IVC corresponding to the engine operating state, the following effect can be obtained.

That is, when calculating the target IVC based on the engine operating state and controlling the variable valve operation mechanism B so that the IVC becomes the target IVC, the IVC giving the optimum amount of intake at the time of steady operation (when the actual EGR rate rRe is controlled to the target EGR rate tRe) is set as the target IVC.

For this reason, when shifting from an EGR gas non-introduction region to an EGR gas introduction region, if, before the actual EGR rate rRe converges at the target EGR rate tRe, ending up controlling the IVC to the target IVC at the time of steady operation after the actual EGR rate rRe converges at the target EGR rate tRe, the amount of EGR gas transiently becomes insufficient. As a result, the amount of intake (amount of fresh air) ends up becoming excessive by exactly the amount by which EGR gas was not introduced and knocking is liable to transiently occur.

In this way, when controlling the variable compression ratio mechanism A and variable valve operation mechanism B according to the engine operating state, at the time of transition when shifting from an EGR gas non-introduction region to an EGR gas introduction region until the actual EGR rate rRe increases and converges at the target EGR rate tRe, even if correcting just the target value of the mechanical compression ratio based on the actual EGR rate rRe, knocking is liable to end up occurring.

Further, when shifting from an EGR gas introduction region to an EGR gas non-introduction region, if ending up controlling the IVC to the target IVC at the time of steady operation after the actual EGR rate rRe converges at the target EGR rate tRe before the actual EGR rate rRe falls and converges at the target. EGR rate tRe (=zero), the amount of EGR gas will transiently become excessive. As a result, the amount of intake (amount of fresh air) will end up becoming insufficient by exactly the amount of EGR gas introduced in excess and the engine output is liable to fall.

Therefore, the present embodiment corrects the target IVC based on the actual EGR rate rRe and controls the variable compression ratio mechanism A and variable valve operation mechanism B in tandem. Due to this, it is possible to suppress the occurrence of such knocking and a drop in the engine output.

Figure 14:
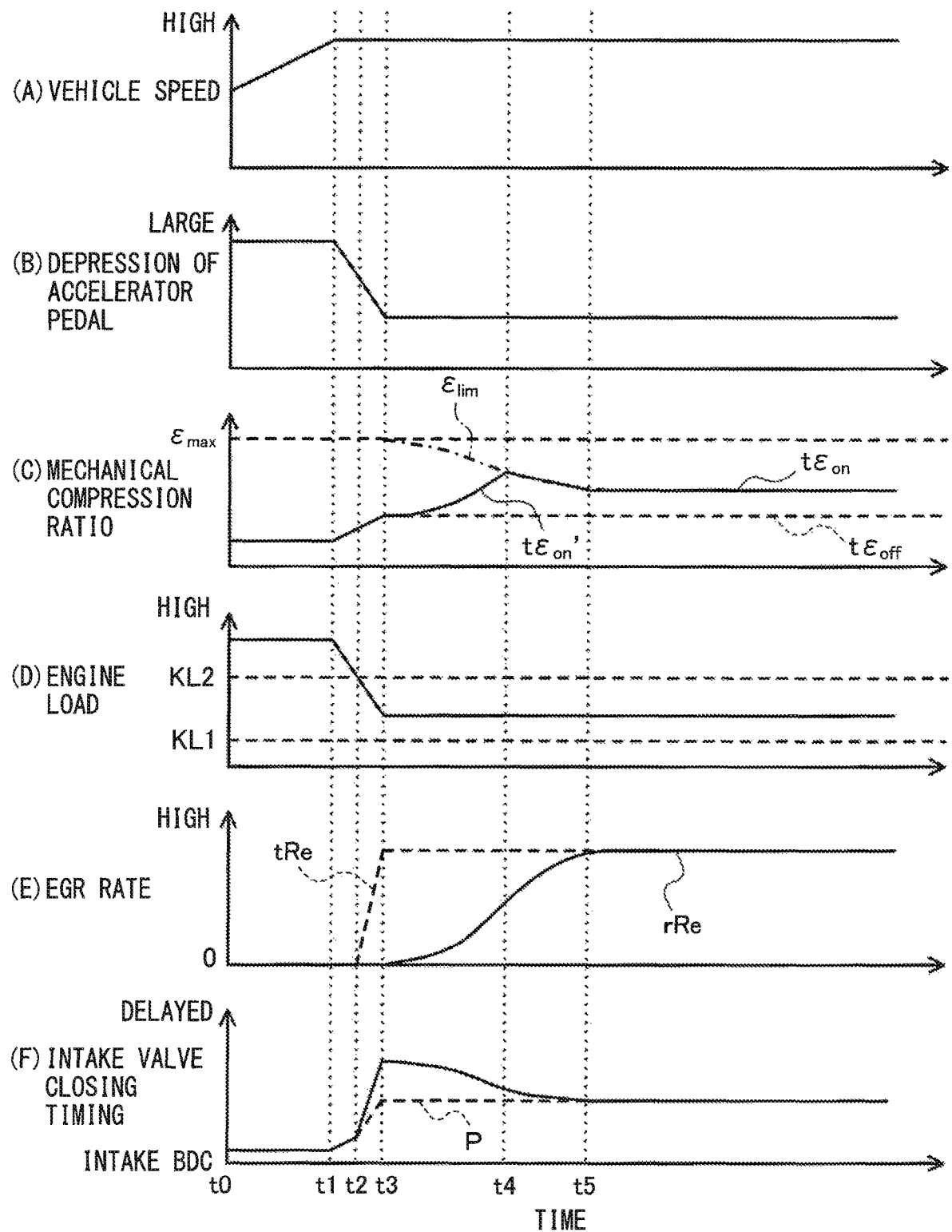
FIG. 14 is a time chart explaining operation of intake valve closing timing control according to a modification of the second embodiment of the present disclosure.

FIG. 14 is a time chart explaining operation of intake valve closing timing control according to a modification of the second embodiment. In FIG. 14, other than the operation of the intake valve closing timing, the operations of the time chart are similar to those of FIG. 12.

As explained above, when calculating the target IVC based on the engine operating state and controlling the variable valve operation mechanism B so that the actual IVC becomes the target IVC, the IVC where the amount of intake becomes optimal in the state where the mechanical compression ratio and the actual EGR rate rRe are controlled to their target values is set as the target IVC.

For this reason, as shown by the broken line P in FIG. 14(F), when at the time t2 the operation shifts from an EGR gas non-introduction region to an EGR gas introduction region, if ending up controlling the actual IVC to the optimum target IVC at the time of steady operation after the actual EGR rate rho converges at the target EGR rate tRe at a time before the time t5 where the actual EGR rate rRe converges at the target EGR rate tRe (in the example shown in FIG. 14, the time t3), the amount of intake (amount of fresh air) will end up becoming excessive by exactly the amount of EGR gas not introduced and knocking is liable to transiently occur.

Therefore, by controlling the IVC in accordance with the actual EGR rate rRe as shown by the solid line in FIG. 14(F), it is possible to control it to an IVC corresponding to the actual EGR rate rRe and mechanical compression ratio and thereby suppress knocking. Specifically, at the time of transition (time t2 to time t5) when the actual EGR rate is low, the target IVC is corrected so that the amount of delay from intake bottom dead center becomes greater so as to decrease the amount of intake by exactly the amount of EGR gas introduced at the time of steady operation. Further, the target IVC is corrected so that the amount of delay from intake bottom dead center gradually becomes smaller as the actual EGR rate converges at the target EGR rate.

Above, embodiments of the present disclosure were explained, but the above embodiments just show some of the examples of application of the present disclosure and are not intended to limit the technical scope of the present disclosure to the specific configurations of the embodiments.

The invention claimed is:

1. A control device for controlling an internal combustion engine, wherein the engine includes:
   an engine body,
   a variable compression ratio mechanism configured to change a mechanical compression ratio of a cylinder defined within the engine body; and
   an intake system configured to recirculate the exhaust discharged from a combustion chamber of the cylinder defined within the engine body to an intake passage of the engine body,
   the control device comprising a compression ratio control part configured to control the variable compression ratio mechanism so that the mechanical compression ratio becomes a target compression ratio resulting in an increase in an actual compression ratio for the cylinder affected by the mechanical compression ratio and an advancement in a timing of a closing of an intake valve configured to introduce intake into the cylinder, wherein the advancement in the timing of the closing of the intake valve closes the intake valve when a piston travelling within the cylinder is further away from a compression top dead center of a compression stroke and increases a temperature of an air-fuel mixture in the combustion chamber at a time of ignition near the compression top dead center of the compression stroke, wherein
   the compression ratio control part is configured to set the target compression ratio to a lower value when exhaust is being recirculated at a predetermined operating region at an engine low load side than when exhaust is not being recirculated.

2. The control device for an internal combustion engine according to claim 1, wherein
   the compression ratio control part is configured to set the target compression ratio to a higher value when exhaust is being recirculated at a predetermined operating region at an engine high load side than when exhaust is not being recirculated.

3. The control device for an internal combustion engine according to claim 1, further comprising:
an exhaust recirculation control part configured to control the intake system so that an exhaust recirculation rate becomes a target recirculation rate; and
an actual recirculation rate estimating part configured to estimate an actual recirculation rate of exhaust, wherein
the compression ratio control part is configured to correct the target compression ratio based on the actual recirculation rate until the exhaust gas recirculation rate increases to converge to the target recirculation rate when starting recirculation of exhaust.

4. The control device for an internal combustion engine according to claim 3, wherein
the compression ratio control part is configured to:
correct the target compression ratio so as to become higher in a predetermined operating region at the engine low load side when the actual recirculation rate is lower than the target recirculation rate; and
correct the target compression ratio so as to become lower in a predetermined operating region at the engine high load side when the actual recirculation rate is lower than the target recirculation rate.

* * * * *